(12) United States Patent
Takeda et al.

(10) Patent No.: US 11,812,440 B2
(45) Date of Patent: Nov. 7, 2023

(54) BANDWIDTH PART OPERATION FOR SINGLE DOWNLINK CONTROL INFORMATION MULTI-CELL SCHEDULING

(71) Applicant: QUALCOMM Incorporated, San Diego, CA (US)

(72) Inventors: Kazuki Takeda, Tokyo (JP); Wanshi Chen, San Diego, CA (US); Peter Gaal, San Diego, CA (US); Xiaoxia Zhang, San Diego, CA (US); Huilin Xu, Temecula, CA (US); Mostafa Khoshnevisan, San Diego, CA (US); Tao Luo, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/216,422

(22) Filed: Mar. 29, 2021

(65) Prior Publication Data
US 2021/0314924 A1 Oct. 7, 2021

Related U.S. Application Data

(60) Provisional application No. 63/004,942, filed on Apr. 3, 2020.

(51) Int. Cl.
*H04W 72/23* (2023.01)
(52) U.S. Cl.
CPC .................. *H04W 72/23* (2023.01)
(58) Field of Classification Search
CPC ........... H04W 72/0453; H04W 72/042; H04W 72/23; H04L 5/001; H04L 5/0094
See application file for complete search history.

(56) References Cited

U.S. PATENT DOCUMENTS

2018/0132210 A1* 5/2018 Rico Alvarino ........ H04L 5/005
2018/0183551 A1 6/2018 Chou et al.
(Continued)

OTHER PUBLICATIONS

Intel Corporation: "Open Issues for Wider Bandwidth Operations", 3GPP TSG RAN WG1 NR Ad-Hoc#2, 3GPP Draft; R1-1710583, 3rd Generation Partnership Project (3GPP), Mobile Competence Centre, 650, Route Des Lucioles, F-06921 Sophia-Antipolis Cedex, France, vol. RAN WG1, No. Qingdao, P.R. China; Jun. 27, 2017-Jun. 30, 2017, Jun. 26, 2017 (Jun. 26, 2017), pp. 1-7, XP051299790, Retrieved from the Internet: URL: http://www.3gpp.org/ftp/Meetings_3GPP_SYNC/RAN1/Docs/ [retrieved on Jun. 26, 2017], paragraph [0002]-paragraph [0003].

(Continued)

*Primary Examiner* — Chi Ho A Lee
*Assistant Examiner* — Andrew Lee
(74) *Attorney, Agent, or Firm* — Harrity & Harrity, LLP

(57) ABSTRACT

Various aspects of the present disclosure generally relate to wireless communication. In some aspects, a user equipment may receive downlink control information (DCI) that schedules a first communication on a first bandwidth part and a second communication on a second bandwidth part; determine one or more parameters for the first bandwidth part and the second bandwidth part based at least in part on the DCI and in accordance with a bandwidth part configuration for a virtual bandwidth part; and perform the first communication and the second communication based at least in part on the one or more parameters. Numerous other aspects are provided.

30 Claims, 10 Drawing Sheets

(56) References Cited

U.S. PATENT DOCUMENTS

| | | | |
|---|---|---|---|
| 2018/0338318 A1 | 11/2018 | Yum et al. | |
| 2019/0044811 A1* | 2/2019 | Miao | H04L 5/0098 |
| 2019/0123800 A1* | 4/2019 | Takeda | H04W 24/10 |
| 2020/0174660 A1* | 6/2020 | Klein | G06F 3/04883 |
| 2020/0228282 A1* | 7/2020 | Kwak | H04L 5/0057 |
| 2020/0337029 A1* | 10/2020 | Yi | H04W 72/042 |
| 2020/0367196 A1* | 11/2020 | Chen | H04W 56/001 |
| 2021/0204309 A1* | 7/2021 | Babaei | H04L 5/001 |
| 2021/0352580 A1* | 11/2021 | Zhou | H04W 52/0209 |
| 2022/0086873 A1* | 3/2022 | Wong | H04L 5/0055 |
| 2022/0183008 A1* | 6/2022 | Zheng | H04W 28/20 |
| 2022/0278802 A1* | 9/2022 | Noh | H04W 24/10 |

OTHER PUBLICATIONS

International Search Report and Written Opinion—PCT/US2021/024915—ISA/EPO—dated Aug. 2, 2021.
Qualcomm Incorporated: "Remaining Issues on BWP", 3GPP TSG RAN WG1 Meeting #93, 3GPP Draft; R1-1807368, Remaining Issues on BWP, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 12, 2018 (May 12, 2018), pp. 1-19, XP051463060, Retrieved from the Internet: URL: https://www.3gpp.org/ftp/tsg_ran/WG1_RL1/TSGR1_93/Docs, [retrieved on May 12, 2018], paragraph [0002].

* cited by examiner

BANDWIDTH PART OPERATION FOR SINGLE DOWNLINK CONTROL INFORMATION MULTI-CELL SCHEDULING

CROSS-REFERENCE TO RELATED APPLICATION

This Patent Applications claims priority to U.S. Provisional Patent Application No. 63/004,942, filed on Apr. 3, 2020, entitled "BANDWIDTH PART OPERATION FOR SINGLE DOWNLINK CONTROL INFORMATION MULTI-CELL SCHEDULING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for bandwidth part (BWP) operation for single downlink control information (DCI) multi-cell scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include receiving downlink control information (DCI) that schedules a first communication on a first bandwidth part and a second communication on a second bandwidth part; determining one or more parameters for the first bandwidth part and the second bandwidth part based at least in part on the DCI and in accordance with a bandwidth part configuration for a virtual bandwidth part; and performing the first communication and the second communication based at least in part on the one or more parameters.

In some aspects, a method of wireless communication, performed by a user equipment, may include receiving, on a second serving cell of the UE, a physical downlink control channel (PDCCH), wherein the PDCCH includes DCI with first control information for a first serving cell of the UE and second control information for the second serving cell of the UE; and communicating on a first bandwidth part associated with the first serving cell and a second bandwidth part associated with the second serving cell in accordance with the DCI.

In some aspects, a method of wireless communication, performed by a base station, may include transmitting DCI that schedules a first communication on a first bandwidth part and a second communication on a second bandwidth part, wherein the DCI indicates one or more parameters for the first bandwidth part and the second bandwidth part in accordance with a bandwidth part configuration for a virtual bandwidth part; and performing the first communication and the second communication based at least in part on the one or more parameters.

In some aspects, a method of wireless communication, performed by a base station, may include transmitting, on a second serving cell of a UE, a PDCCH, wherein the PDCCH includes DCI with first control information for a first serving cell of the UE and second control information for the second serving cell of the UE; and communicating on a first bandwidth part associated with the first serving cell and a second bandwidth part associated with the second serving cell in accordance with the DCI.

In some aspects, a UE for wireless communication may include a memory and one or more processors coupled to the memory. The memory and the one or more processors may be configured to receive DCI that schedules a first communication on a first bandwidth part and a second communication on a second bandwidth part; determine one or more parameters for the first bandwidth part and the second bandwidth part based at least in part on the DCI and in accordance with a bandwidth part configuration for a virtual bandwidth part; and perform the first communication and the second communication based at least in part on the one or more parameters.

In some aspects, a base station for wireless communication may include a memory and one or more processors coupled to the memory. The memory and the one or more processors may be configured to receive, on a second serving cell of the UE, a PDCCH, wherein the PDCCH includes DCI with first control information for a first serving cell of the UE and second control information for the second serving cell of the UE; and communicate on a first bandwidth part associated with the first serving cell and a second bandwidth part associated with the second serving cell in accordance with the DCI.

In some aspects, a UE for wireless communication may include a memory and one or more processors coupled to the memory. The memory and the one or more processors may be configured to transmit DCI that schedules a first communication on a first bandwidth part and a second communication on a second bandwidth part, wherein the DCI indicates one or more parameters for the first bandwidth part and the second bandwidth part in accordance with a bandwidth part configuration for a virtual bandwidth part; and perform the first communication and the second communication based at least in part on the one or more parameters.

In some aspects, a base station for wireless communication may include a memory and one or more processors coupled to the memory. The memory and the one or more processors may be configured to transmit, on a second serving cell of a UE, a PDCCH, wherein the PDCCH includes DCI with first control information for a first serving cell of the UE and second control information for the second serving cell of the UE; and communicate on a first bandwidth part associated with the first serving cell and a second bandwidth part associated with the second serving cell in accordance with the DCI.

In some aspects, a non-transitory computer-readable medium may store one or more instructions for wireless communication. The one or more instructions, when executed by one or more processors of a UE, may cause the one or more processors to receive DCI that schedules a first communication on a first bandwidth part and a second communication on a second bandwidth part; determine one or more parameters for the first bandwidth part and the second bandwidth part based at least in part on the DCI and in accordance with a bandwidth part configuration for a virtual bandwidth part; and perform the first communication and the second communication based at least in part on the one or more parameters.

In some aspects, a non-transitory computer-readable medium may store one or more instructions for wireless communication. The one or more instructions, when executed by one or more processors of a base station, may cause the one or more processors to receive, on a second serving cell of the UE, a PDCCH, wherein the PDCCH includes DCI with first control information for a first serving cell of the UE and second control information for the second serving cell of the UE; and communicate on a first bandwidth part associated with the first serving cell and a second bandwidth part associated with the second serving cell in accordance with the DCI.

In some aspects, a non-transitory computer-readable medium may store one or more instructions for wireless communication. The one or more instructions, when executed by one or more processors of a UE, may cause the one or more processors to transmit DCI that schedules a first communication on a first bandwidth part and a second communication on a second bandwidth part, wherein the DCI indicates one or more parameters for the first bandwidth part and the second bandwidth part in accordance with a bandwidth part configuration for a virtual bandwidth part; and perform the first communication and the second communication based at least in part on the one or more parameters.

In some aspects, a non-transitory computer-readable medium may store one or more instructions for wireless communication. The one or more instructions, when executed by one or more processors of a base station, may cause the one or more processors to transmit, on a second serving cell of a UE, a PDCCH, wherein the PDCCH includes DCI with first control information for a first serving cell of the UE and second control information for the second serving cell of the UE; and communicate on a first bandwidth part associated with the first serving cell and a second bandwidth part associated with the second serving cell in accordance with the DCI.

In some aspects, an apparatus for wireless communication may include means for receiving DCI that schedules a first communication on a first bandwidth part and a second communication on a second bandwidth part; means for determining one or more parameters for the first bandwidth part and the second bandwidth part based at least in part on the DCI and in accordance with a bandwidth part configuration for a virtual bandwidth part; and means for performing the first communication and the second communication based at least in part on the one or more parameters.

In some aspects, an apparatus for wireless communication may include means for receiving, on a second serving cell of the apparatus, a PDCCH, wherein the PDCCH includes DCI with first control information for a first serving cell of the apparatus and second control information for the second serving cell of the apparatus; and means for communicating on a first bandwidth part associated with the first serving cell and a second bandwidth part associated with the second serving cell in accordance with the DCI.

In some aspects, an apparatus for wireless communication may include means for transmitting DCI that schedules a first communication on a first bandwidth part and a second communication on a second bandwidth part, wherein the DCI indicates one or more parameters for the first bandwidth part and the second bandwidth part in accordance with a bandwidth part configuration for a virtual bandwidth part; and means for performing the first communication and the second communication based at least in part on the one or more parameters.

In some aspects, an apparatus for wireless communication may include means for transmitting, on a second serving cell of a UE, a PDCCH, wherein the PDCCH includes DCI with first control information for a first serving cell of the UE and second control information for the second serving cell of the UE; and means for communicating on a first bandwidth part associated with the first serving cell and a second bandwidth part associated with the second serving cell in accordance with the DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
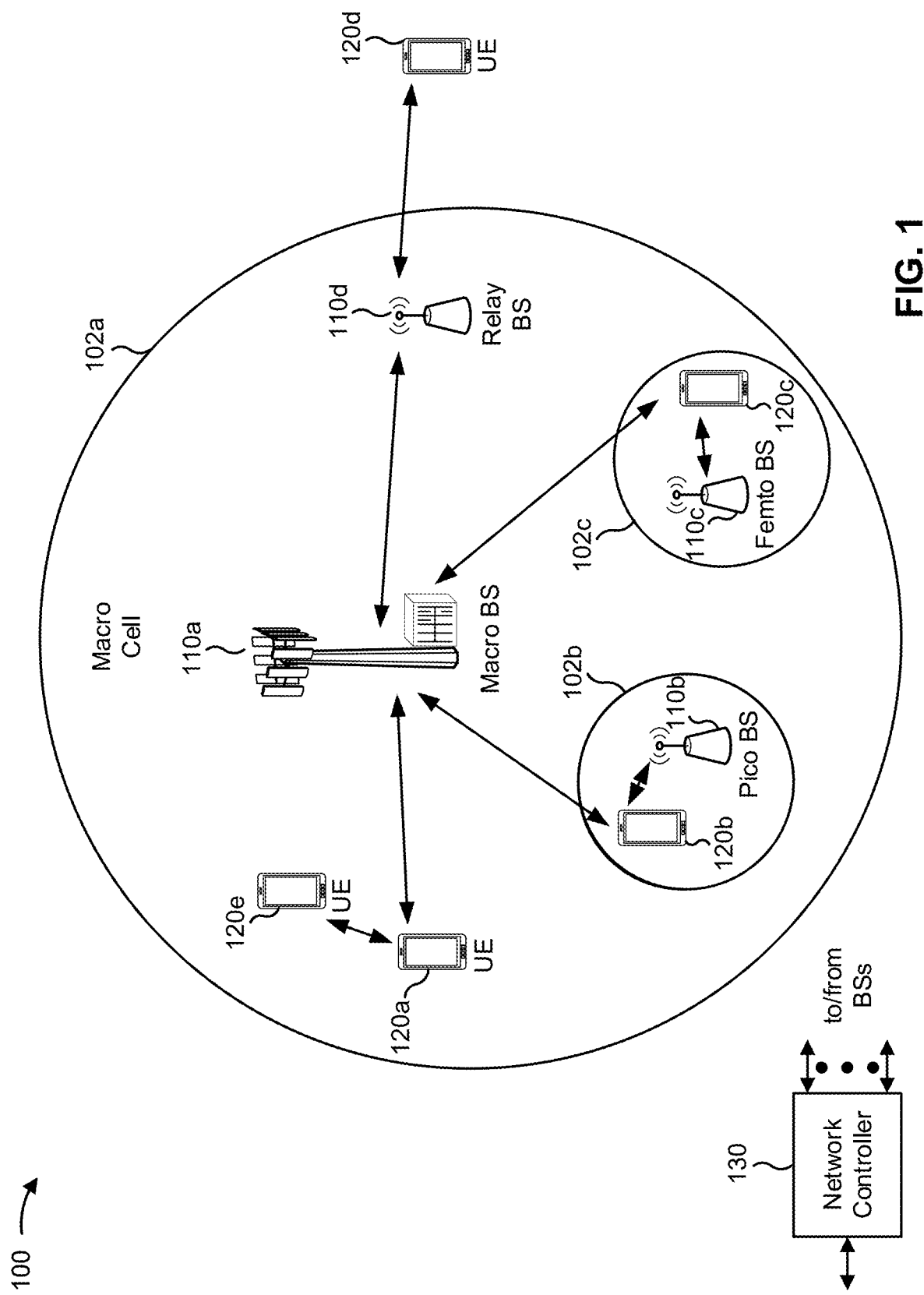
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
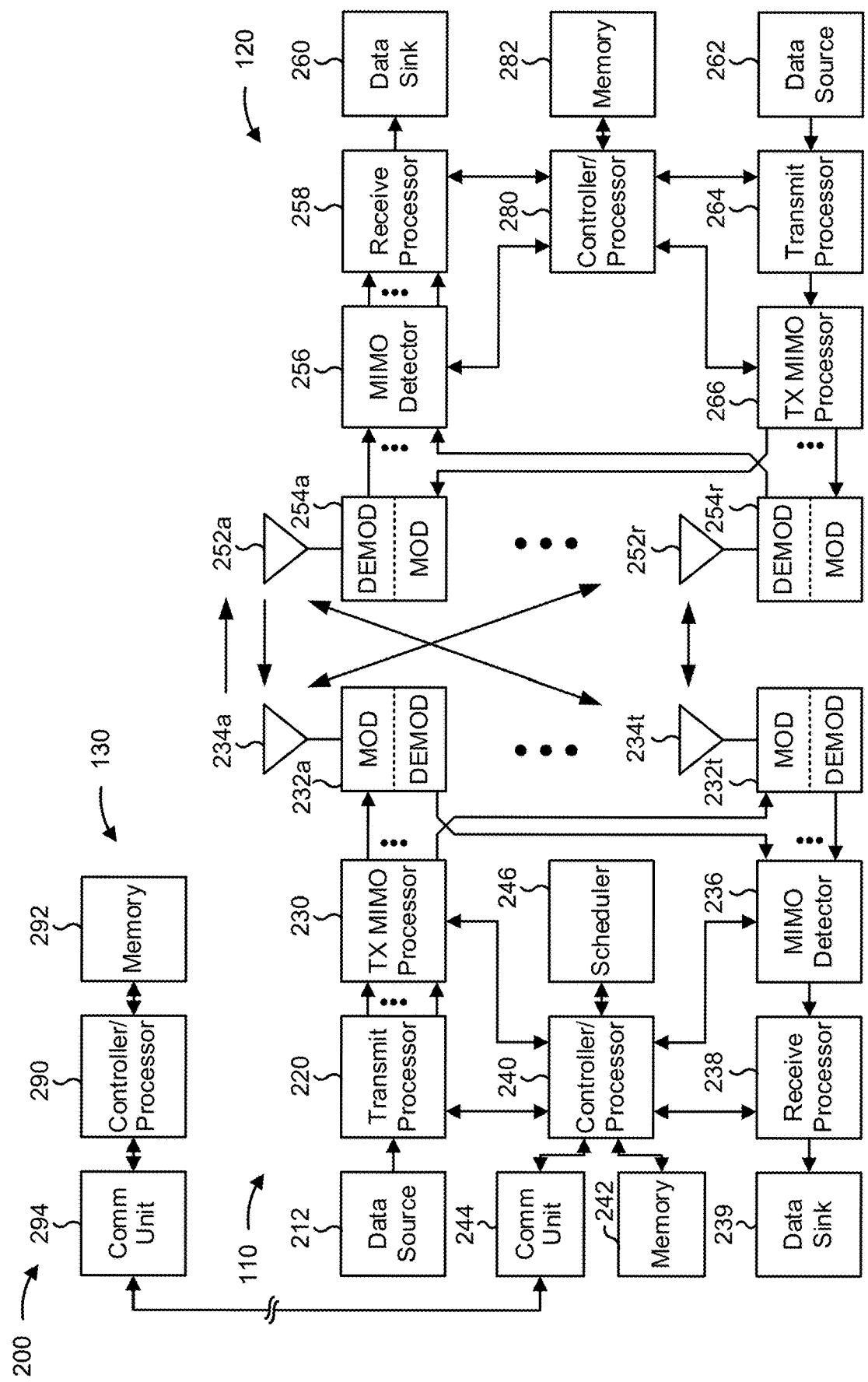
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-10).

Controller/processor 240 of base station 110, controller/processor 280 of UE 120, and/or any other component(s) of FIG. 2 may perform one or more techniques associated with bandwidth part (BWP) operation for single downlink control information (DCI) multi-cell scheduling, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, UE 120 may include means for receiving a DCI that schedules a first communication on a first bandwidth part and a second communication on a second bandwidth part; means for determining one or more parameters for the first bandwidth part and the second bandwidth part based at least in part on the DCI and in accordance with a bandwidth part configuration for a virtual bandwidth part; means for performing the first communication and the second communication based at least in part on the one or more parameters; means for receiving DCI indicating the bandwidth part configuration for the virtual bandwidth part prior to receiving the DCI that schedules the first communication and the second communication; means for receiving configuration information indicating a mapping between a bandwidth part index field of the virtual bandwidth part and bandwidth part indexes of the first bandwidth part and the second bandwidth part; means for receiving second DCI indicating to switch the first bandwidth part from a first bandwidth part with a first index to a second bandwidth part with a second index; means for determining a configuration for the first bandwidth part based at least in part on the second bandwidth part index and a corresponding bandwidth part configuration associated with the virtual bandwidth part; means for determining a configuration for the first bandwidth part based at least in part on the second bandwidth part index and a corresponding bandwidth part configuration associated with the first bandwidth part; means for switching the first bandwidth part and the second bandwidth part based at least in part on the second DCI so that a same search space set identifier is associated with the first bandwidth part and the second bandwidth part after the switching is performed; means for receiving, on a second serving cell of the UE, a physical downlink control channel (PDCCH), wherein the PDCCH includes DCI with first control information for a first serving cell of the UE and second control information for the second serving cell of the UE; means for communicating on a first bandwidth part associated with the first serving cell and a second bandwidth part associated with the second serving cell in accordance with the DCI; means for receiving configuration information indicating a mapping between bandwidth part index fields of the first control information and the second control information, and bandwidth part indexes of the first bandwidth part and the second bandwidth part; means for receiving second DCI indicating to switch the first bandwidth part from a first bandwidth part index to a second bandwidth part index; means for determining a configuration for the first bandwidth part based at least in part on the second bandwidth part index and a corresponding bandwidth part configuration associated with the first bandwidth part; means for switching the first bandwidth part and the second bandwidth part based at least in part on the second DCI so that a same search space set identifier is associated with the first bandwidth part and the second bandwidth part after the switching is performed; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a DCI that schedules a first communication on a first bandwidth part and a second communication on a second bandwidth part, wherein the DCI indicates one or more parameters for the first bandwidth part and the second bandwidth part in accordance with a bandwidth part configuration for a virtual bandwidth part; means for performing the first communication and the second communication based at least in part on the one or more parameters; means for transmitting DCI indicating the bandwidth part configuration for the virtual bandwidth part prior to transmitting the DCI that schedules the first communication and the second communication; means for transmitting configuration information indicating a mapping between a bandwidth part index field of the virtual bandwidth part and bandwidth part indexes of the first bandwidth part and the second bandwidth part; means for transmitting second DCI indicating to switch the first bandwidth part from a first bandwidth part index to a second bandwidth part index; means for switching the first bandwidth part and the second bandwidth part based at least in part on the second DCI, so that a same search space set identifier is associated with the first bandwidth part and the second bandwidth part after the switching is performed; means for transmitting, on a second serving cell of a UE, a PDCCH, wherein the PDCCH includes DCI with first control information for a first serving cell of the UE and second control information for the second serving cell of the UE; means for communicating on a first bandwidth part associated with the first serving cell and a second bandwidth part associated with the second serving cell in accordance with the DCI; means for transmitting configuration information indicating a mapping between bandwidth part index fields of the first control information and the second control information, and bandwidth part indexes of the first bandwidth part and the second bandwidth part; means for transmitting second DCI indicating to switch the first bandwidth part from a first bandwidth part index to a second bandwidth part index; means for switching the first bandwidth part and the second bandwidth part based at least in part on the second DCI so that a same search space set identifier is associated with the first bandwidth part and the second bandwidth part after the switching is performed; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Dynamic spectrum sharing (DSS) enables the parallel use of multiple radio access technologies (RATs), such as LTE and 5G, in the same frequency band. For example, the network may divide the available bandwidth of the frequency band independently for LTE and 5G based at least in part on demand for each of these RATs. DSS provides a mechanism for cross-carrier scheduling, in which a single component carrier (CC) may schedule communications on multiple CCs. In some aspects, a PDCCH of a serving cell may carry DCI that schedules communications (e.g., a physical downlink shared channel (PDSCH) or a physical uplink shared channel (PUSCH)) on another serving cell in addition to or without scheduling a PDSCH or PUSCH on the serving cell. For example, a PDCCH of a secondary cell (SCell) may schedule a communication on a primary cell (PCell) or a primary secondary cell (PSCell). As another example, a PDCCH of a serving cell (e.g., a PCell, a PSCell, or an SCell) may schedule a PDSCH on multiple cells using a single DCI. However, the scheduling of multiple cells using a single DCI may increase a size of the DCI and increase blind decoding complexity for the PDCCH, which negates some of the benefits of DSS and which uses significant computing and communication resources of a UE.

Some techniques and apparatuses described herein provide single-DCI operation, scheduling, and configuration of multiple bandwidth parts (BWPs) associated with multiple CCs, such as for a DSS deployment. For example, some techniques and apparatuses described herein enable a virtual BWP (defined below), which is associated with a first BWP and a second BWP. DCI for the virtual BWP may indicate a configuration for the first BWP and/or the second BWP. In some aspects, the virtual BWP may be configured so that DCI size for the virtual BWP is smaller than a total DCI size of two DCIs that would be used to separately configure the first BWP and the second BWP, thereby reducing DCI size and PDCCH overhead. Some techniques and apparatuses described herein enable a single DCI that is processed similarly to multiple DCIs corresponding to the first BWP and the second BWP. In such a case, DCI size reduction may be achieved, in some cases, by DCI field size compression to enable DCI size alignment between single CC scheduling and multiple CC scheduling. In this way, computing and communication resource usage is reduced, and efficiency of DSS based communications is improved.

Figure 3:
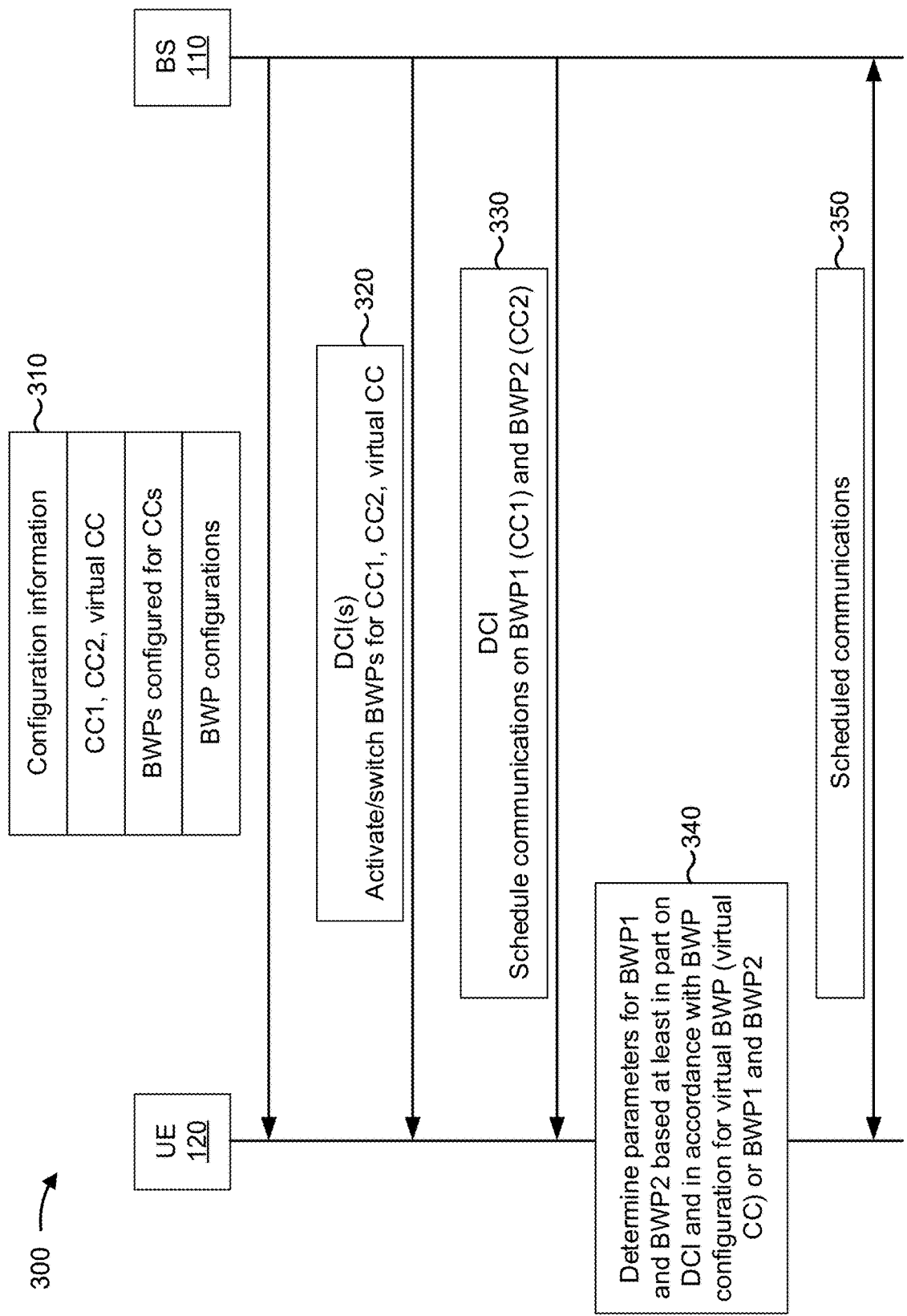
FIG. 3 is a diagram illustrating an example of configuration, scheduling, and communication on multiple BWPs using a single DCI, in accordance with the present disclosure.

FIG. 3 is a diagram illustrating an example 300 of configuration, scheduling, and communication on multiple BWPs using a single DCI, in accordance with the present disclosure. As shown, example 300 includes a UE 120 and a BS 110.

As shown by reference number 310, the BS 110 may provide configuration information to the UE 120. The configuration information may be provided via, for example, radio resource control (RRC) information, medium access control (MAC) signaling, downlink control information (DCI), a combination thereof, or the like. The configuration information may configure a first CC (CC1) and a second CC (CC2). A CC is a frequency block used in association with carrier aggregation (CA). Multiple CCs may be assigned to the same user, thereby increasing the data rate achievable by the user. The CCs of a user can be intra-band (e.g., all in the same frequency band) or inter-band (e.g., in different frequency bands), and can be contiguous or non-contiguous in frequency.

In some aspects, the configuration information may configure a virtual CC. A virtual CC is a CC configured so that a single DCI associated with the virtual CC can indicate scheduling information, BWP configuration information, and/or BWP switching information for CC1 and CC2. In some aspects, the virtual CC may be referred to herein as CC3. In some aspects, the configuration information may not configure a virtual CC. For example, the configuration information may configure only CC1 and CC2. In some aspects, CC1 may be a first serving cell of the UE 120 and CC2 may be a second serving cell of the UE 120. In other aspects, CC1 and CC2 may be the same serving cell of the UE 120. For example, CC1 and/or CC2 may be a PCell, an SCell, a PSCell, and/or the like. CC1 and CC2 may have the same bandwidth or may have different bandwidths. In some aspects, BWPs activated for CC1 and CC2 may have the same bandwidth as each other or different bandwidths than each other.

As shown, the configuration information may configure BWPs for the CCs (e.g., CC1, CC2, and/or the virtual CC). For example, the configuration information may configure a first BWP to be used for the first CC, a second BWP to be used for the second CC, and a virtual BWP to be used for the virtual BWP. A BWP is a contiguous set of physical resource blocks (PRBs) on a given carrier. These PRBs can be selected from a contiguous subset of the common resource blocks for a given numerology. A BWP is defined, for a given numerology, by a set of parameters including subcarrier spacing (SCS), symbol duration, and cyclic prefix length. A virtual BWP is a BWP configured for a virtual CC. One or more parameters of the virtual BWP (e.g., bandwidth, resource block granularity (RBG), resource allocation type, numerology, and/or the like) may be used for both the first BWP and the second BWP, as described elsewhere herein. As further shown, the configuration information may indicate BWP configurations for the BWPs. For example, the BWP configurations may identify one or more parameters of the corresponding BWPs, respective BWP indexes for the corresponding BWPs, and/or the like.

In some aspects, the virtual BWP may include the bandwidths of the BWP1 and the BWP2. For example, the respective configured bandwidths of BWP1 and BWP2 may be within a configured bandwidth of the virtual BWP. In other aspects, at least part of the bandwidth of one or more of BWP1 or BWP2 may be outside of the bandwidth of the virtual BWP.

In some aspects, a configuration of a parameter may be shared between the virtual BWP and BWP1 or BWP2. For example, the virtual CC may be associated with one or more BWP configurations for CC1 and/or CC2. One or more parameters (e.g., numerology, bandwidth, RBG, and/or the like) may be shared between a BWP configuration of the virtual BWP and a BWP configuration of a BWP used for CC1 and/or CC2. For example, a numerology and/or a parameter may be identical between the BWP of CC1 and the BWP, corresponding to CC1, that is included in the virtual BWP. Similarly, a numerology and/or a fundamental parameter may be identical between the BWP of CC2 and the BWP, corresponding to CC2, that is included in the virtual BWP. A parameter that is shared between a BWP of CC1 and a BWP, corresponding to CC1, that is included in the virtual BWP may be referred to as having a same value for the BWP of CC1 and a corresponding region of the virtual BWP (where the region of the virtual BWP is the BWP, corresponding to CC1, that is included in the virtual BWP). A parameter that is shared between a BWP of CC2 and a BWP, corresponding to CC2, that is included in the virtual BWP may be referred to as having a same value for the BWP of CC2 and a corresponding region of the virtual BWP (where the region of the virtual BWP is the BWP, corresponding to CC1, that is included in the virtual BWP). Thus, a single DCI message indicating a configuration of the virtual CC may indicate parameters of CC1 and CC2.

As a specific example, CC1 may be associated with a resource allocation (RA) type 0, an RBG of 8 resource blocks (RBs), and a bandwidth (BW) of 100 RBs. This may correspond to a frequency domain resource allocation (FDRA) field size for DCI for CC1 of 13 bits. CC2 may be associated with an RA type 0, an RBG of 16 RBs, and a BW of 273 RBs, leading to an FDRA field size for DCI for CC2 of 18 bits. Thus, separately signaling the configurations for BWPs of CC1 and CC2 may use a total of 18+13=31 bits. However, if CC1 is configured in the virtual CC with an RA type 0, an RBG of 16 RBs (as compared to 8 RBs above), and a BW of 100 RBs, then CC1's DCI FDRA field may use 7 bits. Similarly, if CC2 is configured in virtual CC with an RA type 0, an RBG of 16 RBs, and a BW of 273 RBs, then CC2's DCI FDRA field may use 18 bits. Thus, an FDRA field size for DCI for the virtual CC is 7+18=25 bits. This represents a 6-bit reduction over providing separate DCI for the CCs by using a same FDRA field for both CCs, and by imputing the virtual CC's BWP configuration to CC1. Thus, a size of the DCI is smaller than a cumulative size of DCIs, used to indicate one or more parameters, that are for BWPs of CC1 and CC2. Conversely, by providing DCI for CC1 separately, the 8-RB RBG can be used, which provides an adjustable DCI size and increased flexibility of BWP configuration.

In some aspects, the configuration information may indicate respective BWP configurations of CC1 and CC2. For example, the configuration information may not identify a virtual BWP configuration for the virtual CC. In this case, the respective BWP configurations may comprise single-carrier scheduling configurations. For example, physical downlink shared channel (PDSCH) configuration parameters for CC1 and CC2 may be used for the BWP configuration. In this case, DCI field size compression may be used to enable DCI size alignment between single-CC scheduling and multi-CC scheduling (e.g., so that the multi-CC DCI has a same size as a single-CC DCI for CC1 or CC2, thereby reducing DCI size and blind decoding complexity) without additional RRC signaling. As a specific example, CC1 may be associated with an RA type 0, an RBG of 8 RBs, and a BW of 100 RBs. This may correspond to an FDRA field size for DCI for CC1 of 13 bits. CC2 may be associated with an RA type 0, an RBG of 16 RBs, and a BW of 273 RBs, leading to an FDRA field size for DCI for CC2 of 18 bits. Thus, separately signaling the configurations for BWPs of CC1 and CC2 may use a total of 18+13=31 bits. However, in some aspects, the DCI field interpretations of CC1 and/or CC2 may be modified so that DCI scheduling both CC1 and CC2 can be smaller than 31 bits. For example, the FDRA field in the DCI may be defined as 13 or 18 bits. Then, the field having 13 or 18 bits may be split to two sub-fields: one sub-field for CC1, and the other sub-field for CC2. In this example, each sub-field has less than the 13 or 18 bits. The UE 120 may interpret the sub-fields for CC1 and for CC2 as if the sub-fields are one or more most significant bit (MSB) or least significant bit (LSB) bit(s) of the FDRA field for CC1 and for CC2, respectively. For example, consider when the sub-field for CC1 has 6 bits and the sub-field for CC2 has 12 bits (for a total of 18 bits). Then, the 6 bits may be considered as MSB or LSB bits of the FDRA field for CC1 and the 12 bits may be considered as MSB or LSB bits of the FDRA field for CC2. The remaining 7 bits of FDRA field for CC1 and 6 bits of FDRA field for CC2 may be considered as zeros or another filler value. The split ratio of FDRA field into sub-fields for CC1 and CC2 can be higher-layer configured or can be based at least in part on the ratio of the bandwidths, the numbers of RBs, and/or the like.

In some aspects, the configuration information may identify multiple BWPs for a CC. In this case, as shown by reference number 320, the BS 110 may provide DCI activating or switching one or more BWPs. For example, the DCI may indicate a BWP to be activated or deactivated for a corresponding CC, or may indicate a BWP that a CC is to switch to (e.g., using a BWP index associated with the BWP). The DCI may be provided in a PDCCH and/or the like.

In some aspects, the DCI activating or switching the one or more BWPs may relate to a virtual CC/virtual BWP configuration (e.g., may indicate a BWP configuration for the virtual BWP). In this case, the configuration information may identify one or more associations (e.g., one or more mappings) between a BWP index field value of DCI for the virtual CC, and BWP indexes of BWPs to be activated, deactivated, or switched for CC1 and/or CC2. For example, associations between a BWP index field value and BWP indexes of CC1 and CC2 may be configured by RRC signaling. A BWP index field of the DCI may indicate a BWP index for the virtual CC, and the UE 120 may identify BWPs for CC1 and CC2 based at least in part on the associations indicated by the configuration information. Thus, the virtual BWP may be associated with a plurality of BWP configurations that indicate respective parameters for CC1 and CC2. Further, a single BWP index field of the DCI may jointly indicate respective BWP indexes of multiple BWPs.

In some aspects, the BWP index for CC1 may be switched by DCI for CC1, and/or a BWP index for CC2 may be switched by DCI for CC2. Additionally, or alternatively, a BWP index for CC1 may be switched by DCI for the virtual CC, and/or a BWP index for CC2 may be switched by DCI for the virtual CC. In this case, a target BWP for a CC may be associated with a different parameter value if the CC is switched using the DCI for the virtual CC than if the CC is switched using the DCI for the CC. In other words, a parameter associated with a target BWP may be different if determined based at least in part on the BWP configuration for the virtual BWP (associated with the virtual CC) than if determined based at least in part on a BWP configuration for the target BWP. For example, the UE 120 may read each field of the DCI according to a BWP configuration of the target BWP. Therefore, if the target BWP is indicated by the DCI for the virtual CC, the UE 120 may process the DCI according to a BWP configuration of a virtual BWP, and if the target BWP is indicated by the DCI for the CC, the UE 120 may process the DCI according to a BWP configuration of the CC. Thus, different values of a parameter (e.g., RBG1 and/or the like) may be indicated by selectively indicating a BWP activation/deactivation/switch using DCI associated with a CC or a virtual CC.

In some aspects, the BWP index for CC1 and/or CC2 may be switched by a single DCI message associated with CC1 and CC2. For example, the UE 120 may be configured (e.g., using RRC signaling and/or the like) with information indicating an association (e.g., a mapping) between a BWP index of the single DCI message and BWP indexes of BWPs associated with CC1 and CC2. In some aspects, the DCI may include a single BWP indicator field that indicates BWP indexes for CC1 and CC2 jointly. In some aspects, the DCI may include two BWP indicator fields that indicate BWP indexes for CC1 and CC2 independently (e.g., separately). For example, a first bandwidth part and a second bandwidth part may be associated with respective bandwidth part index fields that separately indicate respective bandwidths of the first bandwidth part and the second bandwidth part.

In some aspects, the UE 120 may switch CC1 based at least in part on receiving DCI indicating to switch CC2, or vice versa. For example, CC1 and CC2 may be configured to use a same search space set identifier. The UE 120 may be associated with a rule indicating that a search space set identifier for CC1 (e.g., a scheduling CC) and a search space set identifier for CC2 (e.g., a scheduled CC) are to be the same as each other after BWP switching is performed. Thus, when the UE 120 performs BWP switching for either of the scheduling CC or the scheduled CC, the UE 120 may also switch the BWP of the other CC (e.g., the scheduled CC or the scheduling CC, respectively) so that CC1 and CC2 are associated with the same search space set identifier after the switch is performed. Thus, to satisfy the rule described above, if the BWP of CC1 is switched, then the BWP of CC2 should be switched, and vice versa.

As shown by reference number 330, the UE 120 may receive DCI scheduling communications on BWP1 (e.g., the active BWP for CC1) and BWP2 (e.g., the active BWP for CC2). In some aspects, the DCI may be associated with a virtual CC (e.g., a virtual BWP). In some aspects, the DCI may be associated with one of CC1 or CC2. In some aspects, the DCI may be associated with CC1 and CC2. As shown by reference number 340, the UE 120 may determine parameters for BWP1 and BWP2 based at least in part on the DCI and in accordance with at least one of the BWP configuration for the virtual BWP (e.g., associated with the virtual CC) or the BWP configurations of BWP1 and BWP2. For example, the UE 120 may determine the parameters in accordance with a BWP configuration corresponding to the CC/BWP with which the DCI is associated. If the DCI is associated with only CC1 (e.g., BWP1), then the UE 120 may determine the parameters in accordance with CC1/BWP1's BWP configuration. If the DCI is associated with the virtual CC (e.g., the virtual BWP), then the UE 120 may determine the parameters in accordance with the virtual CC/BWP's BWP configuration. If the DCI is associated with CC1 and CC2 (e.g., BWP1 and BWP2), then the UE 120 may determine the parameters in accordance with CC1 and CC2's individual BWP configurations. The DCI may be provided on a PDCCH and/or the like.

As shown by reference number 350, the UE 120 and the BS 110 may perform the scheduled communications on BWP1 and BWP2. For example, the UE 120 may transmit one or more PUSCHs or receive one or more PDSCHs in accordance with the DCI. The UE 120 may interpret the DCI as described above in connection with reference numbers 330 and 340. Thus, the size and decoding complexity of the DCI may be reduced relative to transmitting two separate DCIs for CC1 and CC2, which conserves computing and communication resources of the UE 120.

As indicated above, FIG. 3 is provided as an example. Other examples may differ from what is described with respect to FIG. 3.

Figure 4:
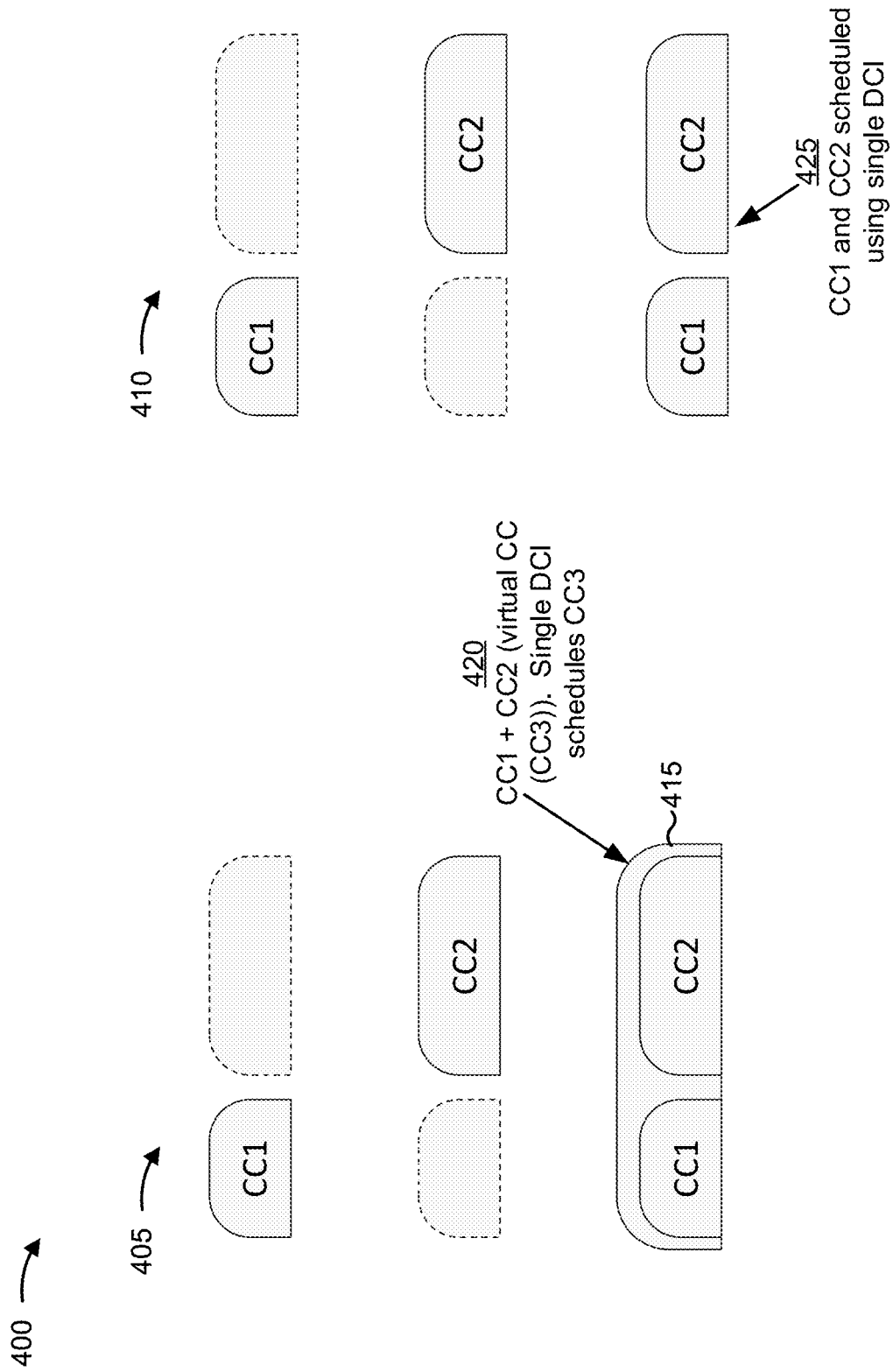
FIG. 4 is a diagram illustrating an example of virtual-BWP-based BWP operation and multi-component-carrier (CC) based BWP operation.

FIG. 4 is a diagram illustrating an example 400 of virtual-BWP-based BWP operation (shown by reference number 405) and multi-CC-based BWP operation (shown by reference number 410). As shown by reference number 415, a virtual CC (e.g., CC3) may be configured and may be associated with a virtual BWP. In this example, the bandwidths of CC1 and CC2 are included within the virtual CC. As shown by reference number 420, a single DCI may schedule CC3. For example, the single DCI may schedule communications on CC1 and CC2 similarly to scheduling two communications on CC3 that occur in the respective bandwidths of CC1 and CC2. A UE 120 may determine parameters for the communications based at least in part on a BWP configuration of CC3.

As shown by reference number 425, in the multi-CC-based BWP operation, a single DCI may schedule communications on CC1 and CC2. For example, the single DCI to schedule CC1 and CC2 may be interpreted similarly to two DCIs scheduling CC1 and CC2 separately. Thus, the UE behavior may be similar to cross-carrier scheduling from one CC to two CCs.

As indicated above, FIG. 4 is provided as one or more examples. Other examples may differ from what is described with regard to FIG. 4.

Figure 5:
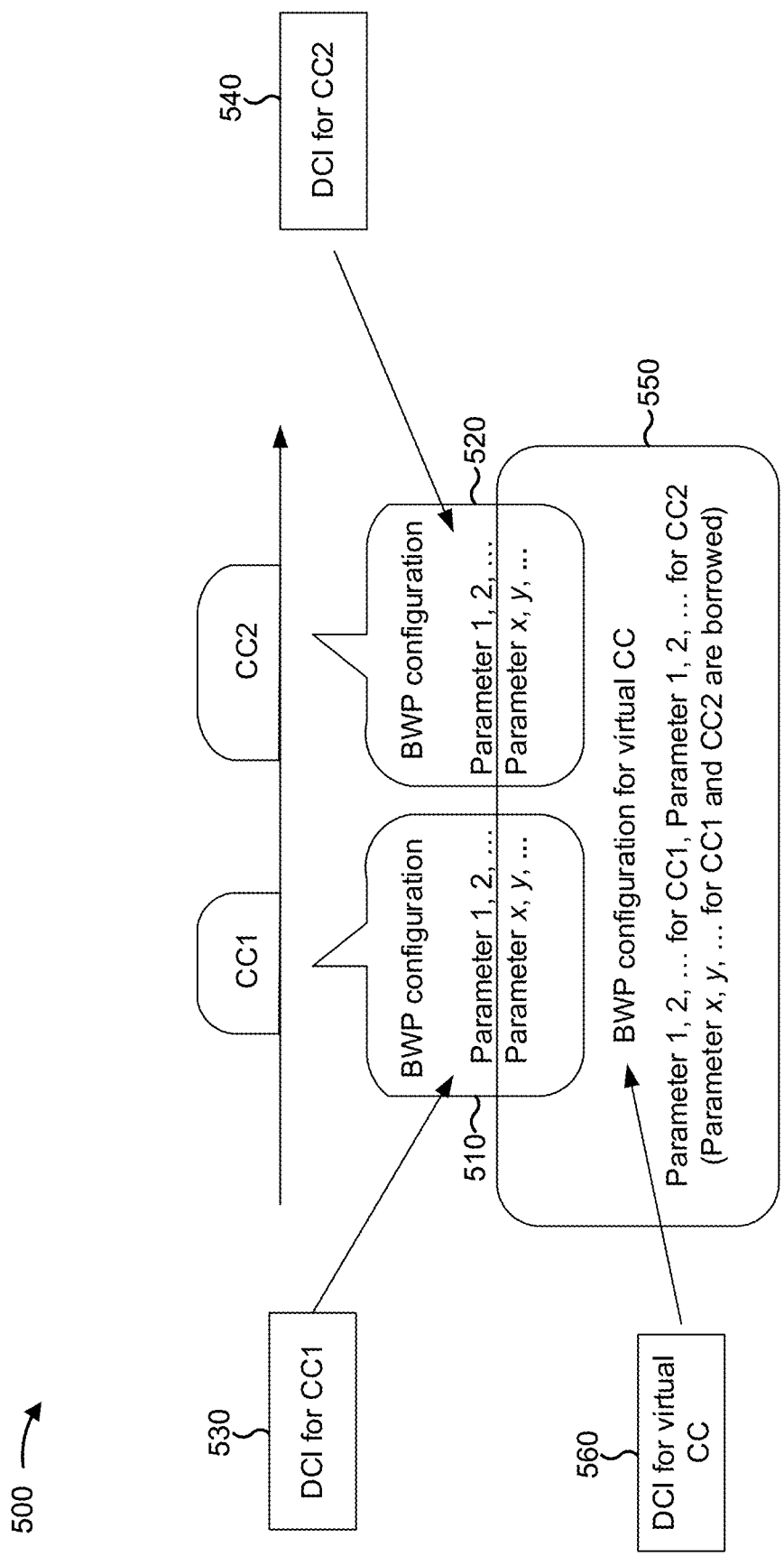
FIG. 5 is a diagram illustrating an example of a configuration for a virtual CC, a first CC, and a second CC, in accordance with the present disclosure.

FIG. 5 is a diagram illustrating an example 500 of a configuration for a virtual CC, a first CC, and a second CC, in accordance with the present disclosure. As shown, example 500 includes a CC1 (e.g., a first serving cell) and a CC2 (e.g., a second serving cell). As noted above, in some aspects, CC1 and CC2 can be different serving cells, whereas in other aspects, CC1 and CC2 can be the same serving cell. CC1 is associated with a first BWP configuration, shown by reference number 510, and CC2 is associated with a second BWP configuration, shown by reference number 520. If a UE receives DCI for CC1, as shown by reference number 530, the UE may interpret the DCI for CC1 according to the BWP configuration for CC1. Similarly, if a UE receives DCI for CC2, as shown by reference number 540, the UE may interpret the DCI for CC2 according to the BWP configuration for CC2.

As shown by reference number 550, a virtual CC may be associated with a BWP configuration. As shown, the rectangle indicating the BWP configuration for the virtual CC encompasses parameters x and y of the BWP configurations for CC1 and CC2. This may indicate that the parameters x and y are shared between the virtual BWP configuration and the BWP configurations of CC1 and CC2. In other words, the parameters x and y may be borrowed from the BWP configurations of CC1 and CC2 for the virtual BWP configuration. Parameters 1 and 2 may be configured separately for the virtual BWP configuration and for the BWP configurations of CC1 and CC2. Thus, a virtual BWP configuration provides flexibility in parameter configurations and DCI size relative to using only CC-specific BWP configurations. If a UE receives DCI for the virtual CC, as shown by reference number 560, the UE may interpret the DCI for the virtual CC according to the BWP configuration of the virtual CC. For example, the UE may determine parameters 1 and 2 for CC1 and CC2 according to the virtual BWP configuration, and may determine parameters x and y according to the virtual BWP configuration (where x and y are shared with the BWP configurations of CC1 and CC2).

As indicated above, FIG. 5 is provided as one or more examples. Other examples may differ from what is described with regard to FIG. 5.

Figure 6:
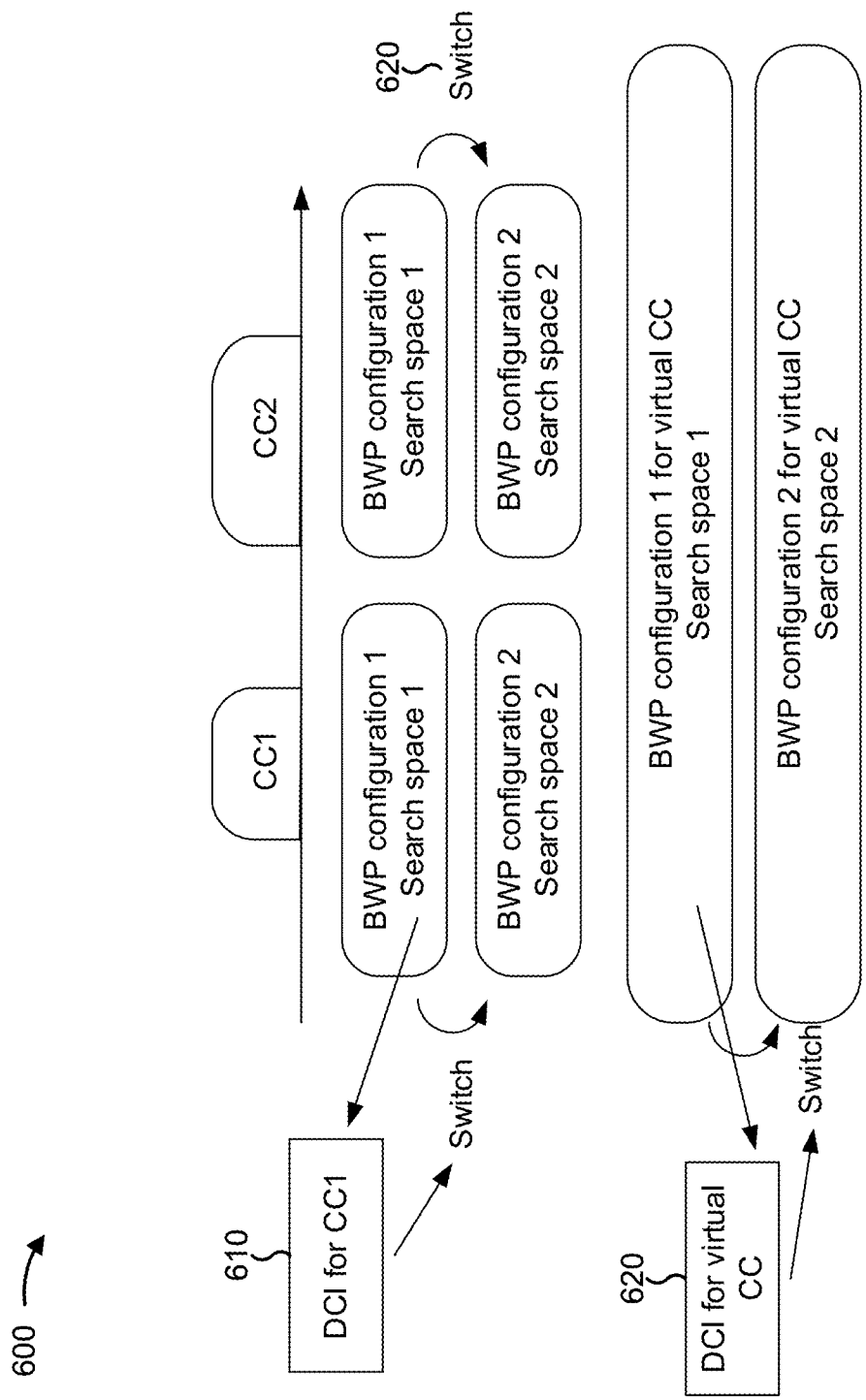
FIG. 6 is a diagram illustrating an example of BWP switching based at least in part on search spaces of BWPs, in accordance with the present disclosure.

FIG. 6 is a diagram illustrating an example 600 of BWP switching based at least in part on search spaces of BWPs, in accordance with the present disclosure. As shown in example 600, CC1 and CC2 may be associated with respective BWP configurations 1 and 2. BWP configurations 1 are associated with a search space 1, and BWP configurations 2 are associated with a search space 2. A search space is an area in the downlink resource grid where a PDCCH may be carried. A UE searches a search space for a PDCCH that is pertinent to the UE. The PDCCH may carry DCI, and the UE may implement parameters indicated by the DCI.

As shown by reference number 610, if DCI for CC1 indicates that CC1 is to be switched from BWP configuration 1 to BWP configuration 2, then CC2 may also be switched (as indicated by reference number 620) from BWP configuration 1 to BWP configuration 2 so that the same search space or search space set is used for both CCs/BWPs. Similarly, a virtual CC, which includes CC1 and CC2, may be configured with a BWP configuration 1 and a BWP configuration 2 that are associated with respective search spaces 1 and 2. As shown by reference number 620, if DCI for the virtual CC indicates that the virtual CC (i.e., CC1 and CC2) is to be switched from BWP configuration 1 to BWP configuration 2, CC1 and CC2 may be switched from BWP configuration 1 of the virtual CC to BWP configuration 2 of the virtual CC. Thus, the same search space may be maintained for CC1 and CC2.

As indicated above, FIG. 6 is provided as one or more examples. Other examples may differ from what is described with regard to FIG. 6.

Figure 7:
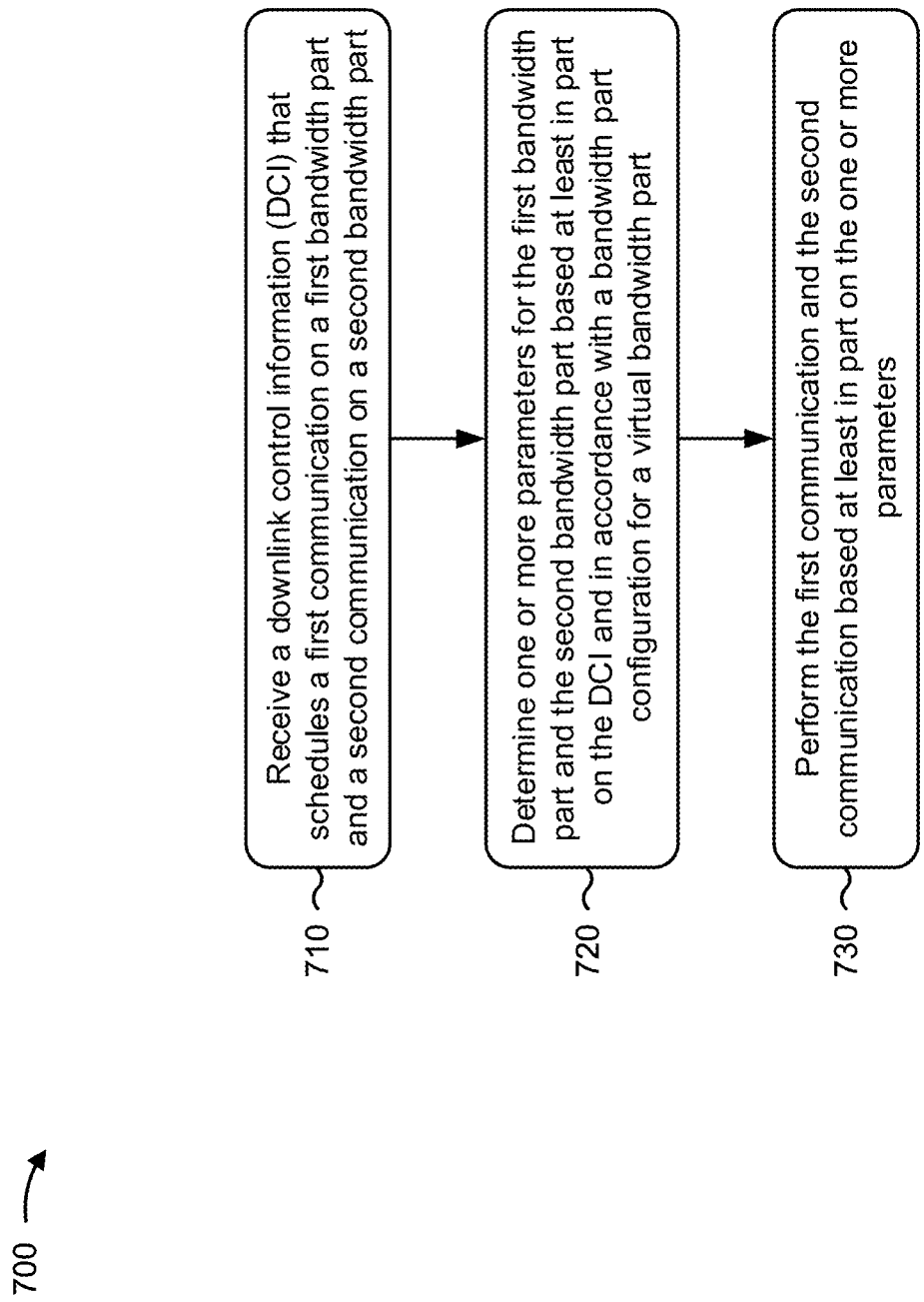
FIG. 7 is a diagram illustrating an example process performed, for example, by a user equipment, in accordance with the present disclosure.

FIG. 7 is a diagram illustrating an example process 700 performed, for example, by a UE, in accordance with the present disclosure. Example process 700 is an example where the UE (e.g., UE 120 and/or the like) performs operations associated with BWP operation for single DCI multi-cell scheduling.

As shown in FIG. 7, in some aspects, process 700 may include receiving a DCI that schedules a first communication on a first bandwidth part and a second communication on a second bandwidth part (block 710). For example, the UE (e.g., using antenna 252, DEMOD 254, MIMO detector 256, receive processor 258, controller/processor 280, and/or the like) may receive DCI that schedules a first communication on a first bandwidth part and a second communication on a second bandwidth part, as described above.

As further shown in FIG. 7, in some aspects, process 700 may include determining one or more parameters for the first bandwidth part and the second bandwidth part based at least in part on the DCI and in accordance with a bandwidth part configuration for a virtual bandwidth part (block 720). For example, the UE (e.g., using antenna 252, DEMOD 254, MIMO detector 256, receive processor 258, controller/processor 280, and/or the like) may determine one or more parameters for the first bandwidth part and the second bandwidth part based at least in part on the DCI and in accordance with a bandwidth part configuration for a virtual bandwidth part, as described above.

As further shown in FIG. 7, in some aspects, process 700 may include performing the first communication and the second communication based at least in part on the one or more parameters (block 730). For example, the UE (e.g., using antenna 252, DEMOD 254, MIMO detector 256, receive processor 258, controller/processor 280, transmit processor 264, TX MIMO processor 266, MOD 254, antenna 252, and/or the like) may perform the first communication and the second communication based at least in part on the one or more parameters, as described above.

Process 700 may include additional aspects, such as any single aspect or any combination of aspects described below and/or in connection with one or more other processes described elsewhere herein.

In a first aspect, the DCI is DCI for the virtual bandwidth part.

In a second aspect, alone or in combination with the first aspect, the DCI indicates the bandwidth part configuration for the virtual bandwidth part, and the virtual bandwidth part is associated with a plurality of bandwidth part configurations that indicate respective parameters for the first bandwidth part and the second bandwidth part.

In a third aspect, alone or in combination with one or more of the first and second aspects, a parameter, of the one or more parameters, comprises at least one of a numerology or a bandwidth, and the parameter has a same value for the first bandwidth part and a corresponding region of the virtual bandwidth part, or has a same value for the second bandwidth part and a corresponding region of the virtual bandwidth part.

In a fourth aspect, alone or in combination with one or more of the first through third aspects, a parameter, of the one or more parameters, associated with a corresponding bandwidth part of the first bandwidth part and the second bandwidth part, is different if determined based at least in part on the bandwidth part configuration for the virtual bandwidth part than if determined based at least in part on a bandwidth part configuration for the corresponding bandwidth part.

In a fifth aspect, alone or in combination with one or more of the first through fourth aspects, a size of the DCI is smaller than a cumulative size of DCIs, used to indicate the one or more parameters, that are for the first bandwidth part and the second bandwidth part.

In a sixth aspect, alone or in combination with one or more of the first through fifth aspects, process 700 includes receiving DCI indicating the bandwidth part configuration for the virtual bandwidth part prior to receiving the DCI that schedules the first communication and the second communication.

In a seventh aspect, alone or in combination with one or more of the first through sixth aspects, process 700 includes receiving configuration information indicating a mapping between a bandwidth part index field of the virtual bandwidth part and bandwidth part indexes of the first bandwidth part and the second bandwidth part.

In an eighth aspect, alone or in combination with one or more of the first through seventh aspects, a single bandwidth part index field jointly indicates respective bandwidth part indexes of the first bandwidth part and the second bandwidth part.

In a ninth aspect, alone or in combination with one or more of the first through eighth aspects, the first bandwidth part and the second bandwidth part are associated with respective bandwidth part index fields that separately indicate respective bandwidths of the first bandwidth part and the second bandwidth part.

In a tenth aspect, alone or in combination with one or more of the first through ninth aspects, the DCI is first DCI, and process 700 includes receiving second DCI indicating to switch the first bandwidth part from a first bandwidth part with a first index to a second bandwidth part with a second index.

In an eleventh aspect, alone or in combination with one or more of the first through tenth aspects, the second DCI is for the virtual bandwidth part.

In a twelfth aspect, alone or in combination with one or more of the first through eleventh aspects, process 700 includes determining a configuration for the first bandwidth part based at least in part on the second bandwidth part index and a corresponding bandwidth part configuration associated with the virtual bandwidth part.

In a thirteenth aspect, alone or in combination with one or more of the first through twelfth aspects, the second DCI is for the first bandwidth part.

In a fourteenth aspect, alone or in combination with one or more of the first through thirteenth aspects, process 700 includes determining a configuration for the first bandwidth part based at least in part on the second bandwidth part index and a corresponding bandwidth part configuration associated with the first bandwidth part.

In a fifteenth aspect, alone or in combination with one or more of the first through fourteenth aspects, process 700 includes switching the first bandwidth part and the second bandwidth part based at least in part on the second DCI so that a same search space set identifier is associated with the first bandwidth part and the second bandwidth part after the switching is performed.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
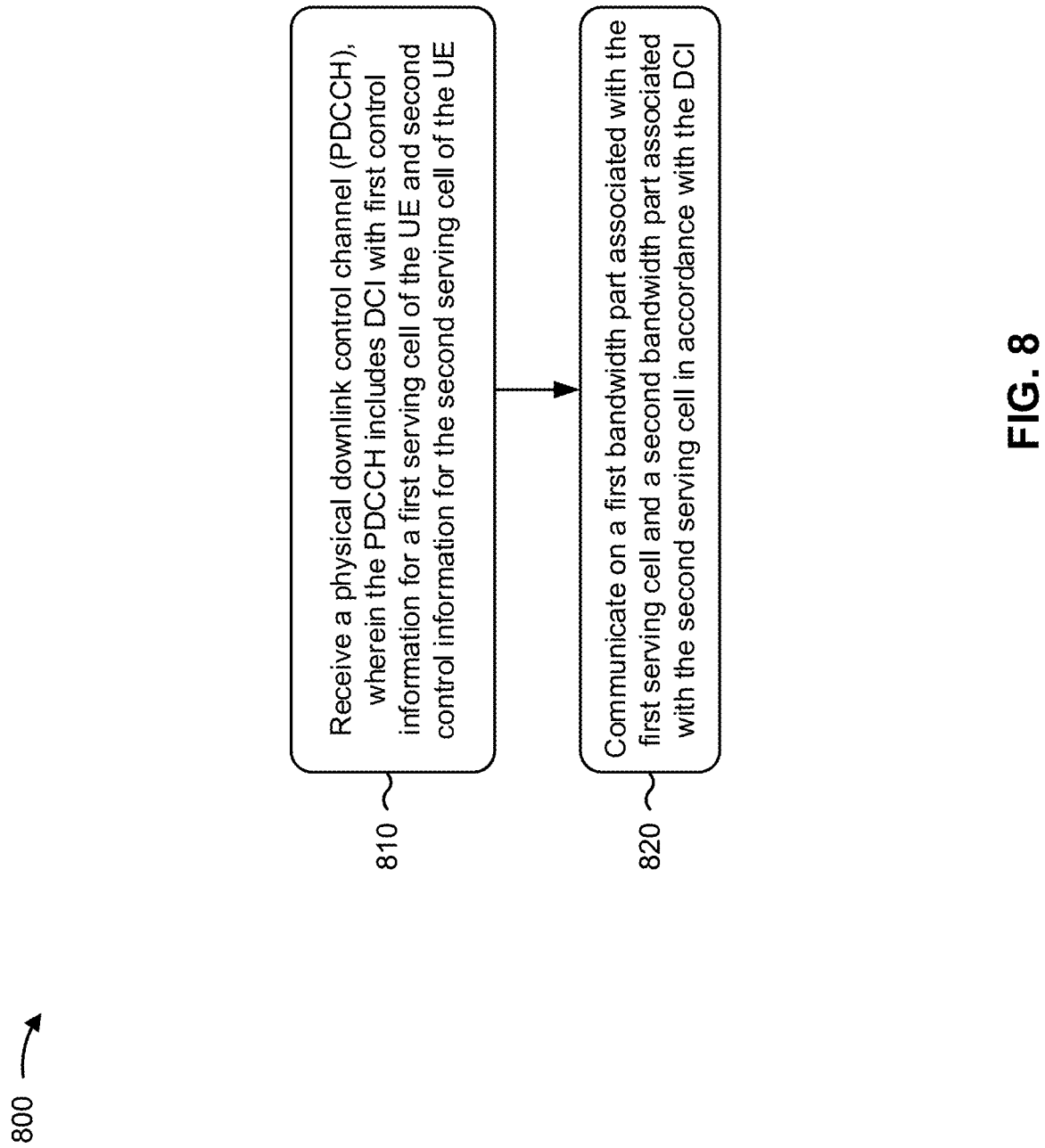
FIG. 8 is a diagram illustrating an example process performed, for example, by a user equipment, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with BWP operation for single DCI multi-cell scheduling.

As shown in FIG. 8, in some aspects, process 800 may include receiving, on a second serving cell of the UE, a PDCCH, wherein the PDCCH includes DCI with first control information for a first serving cell of the UE and second control information for the second serving cell of the UE (block 810). For example, the UE (e.g., using antenna 252, DEMOD 254, MIMO detector 256, receive processor 258, controller/processor 280, and/or the like) may receive, on a second serving cell of the UE, a PDCCH, as described above. In some aspects, the PDCCH includes DCI with first control information for a first serving cell of the UE and second control information for the second serving cell of the UE. In some aspects, the first serving cell and the second serving cell may be a same serving cell.

As further shown in FIG. 8, in some aspects, process 800 may include communicating on a first bandwidth part associated with the first serving cell and a second bandwidth part associated with the second serving cell in accordance with the DCI (block 820). For example, the UE (e.g., using antenna 252, DEMOD 254, MIMO detector 256, receive processor 258, controller/processor 280, controller/processor 280, transmit processor 264, TX MIMO processor 266, MOD 254, and/or the like) may communicate on a first bandwidth part associated with the first serving cell and a second bandwidth part associated with the second serving cell in accordance with the DCI, as described above.

Process 800 may include additional aspects, such as any single aspect or any combination of aspects described below and/or in connection with one or more other processes described elsewhere herein.

In a first aspect, the DCI comprises a single DCI message.

In a second aspect, alone or in combination with the first aspect, communicating on the first bandwidth part and the second bandwidth part in accordance with the DCI further comprises communicating in accordance with respective bandwidth part configurations of the first bandwidth part and the second bandwidth part.

In a third aspect, alone or in combination with one or more of the first and second aspects, the respective bandwidth part configurations are indicated by the DCI.

In a fourth aspect, alone or in combination with one or more of the first through third aspects, the respective bandwidth part configurations are indicated by other DCI received prior to the PDCCH.

In a fifth aspect, alone or in combination with one or more of the first through fourth aspects, the first control information and the second control information are indicated by a same one or more fields of the DCI, and a remainder of the DCI is padded in accordance with a maximum size of respective sizes associated with the first control information and the second control information.

In a sixth aspect, alone or in combination with one or more of the first through fifth aspects, process 800 includes receiving configuration information indicating a mapping between bandwidth part index fields of the first control information and the second control information, and bandwidth part indexes of the first bandwidth part and the second bandwidth part.

In a seventh aspect, alone or in combination with one or more of the first through sixth aspects, a single bandwidth part index jointly indicates respective bandwidth part indexes of the first bandwidth part and the second bandwidth part.

In an eighth aspect, alone or in combination with one or more of the first through seventh aspects, the first control information and the second control information are associated with respective bandwidth part indexes that separately indicate respective bandwidths of the first bandwidth part and the second bandwidth part.

In a ninth aspect, alone or in combination with one or more of the first through eighth aspects, the DCI is first DCI, and process 800 includes receiving second DCI indicating to switch the first bandwidth part from a first bandwidth part index to a second bandwidth part index.

In a tenth aspect, alone or in combination with one or more of the first through ninth aspects, the second DCI is for the first bandwidth part.

In an eleventh aspect, alone or in combination with one or more of the first through tenth aspects, process 800 includes determining a configuration for the first bandwidth part based at least in part on the second bandwidth part index and a corresponding bandwidth part configuration associated with the first bandwidth part.

In a twelfth aspect, alone or in combination with one or more of the first through eleventh aspects, process 800 includes switching the first bandwidth part and the second bandwidth part based at least in part on the second DCI so that a same search space set identifier is associated with the first bandwidth part and the second bandwidth part after the switching is performed.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
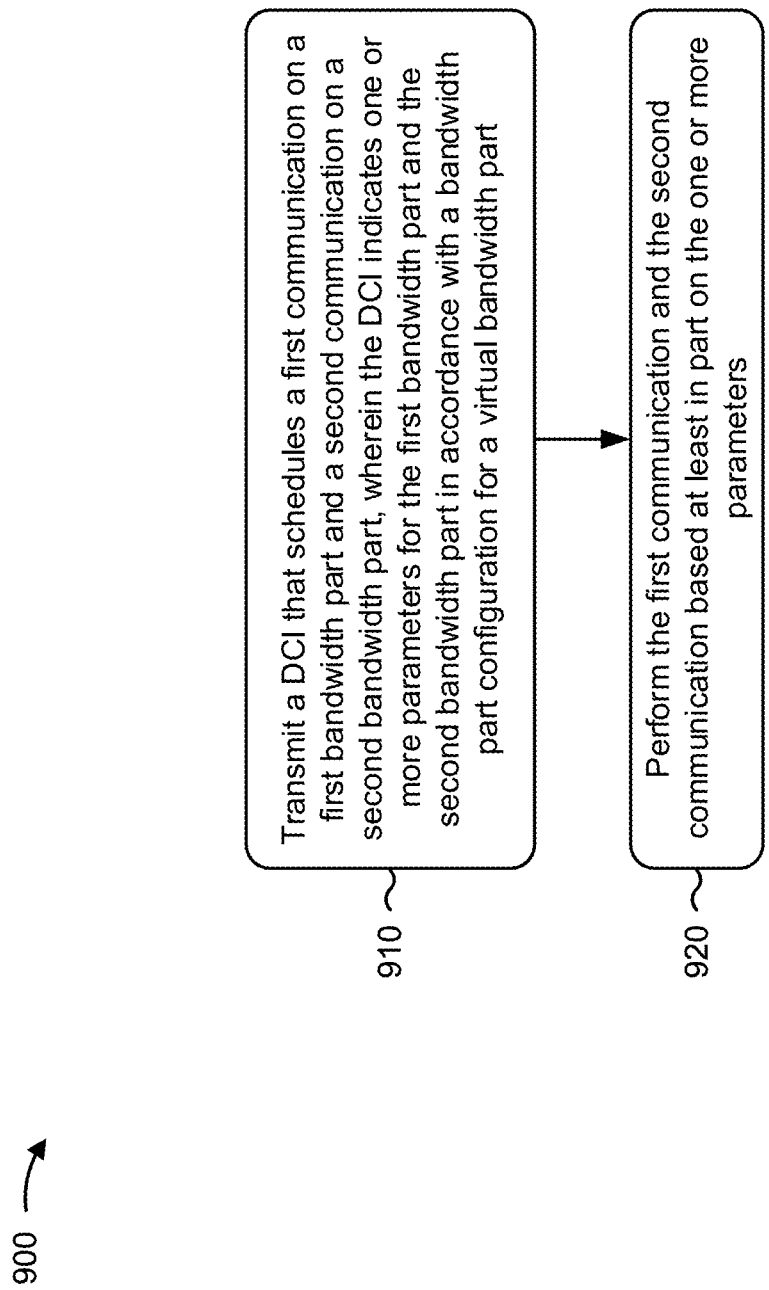
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., BS 110 and/or the like) performs operations associated with BWP operation for single DCI multi-cell scheduling.

As shown in FIG. 9, in some aspects, process 900 may include transmitting DCI that schedules a first communication on a first bandwidth part and a second communication on a second bandwidth part, wherein the DCI indicates one or more parameters for the first bandwidth part and the second bandwidth part in accordance with a bandwidth part configuration for a virtual bandwidth part (block 910). For example, the base station (e.g., using controller/processor 240, transmit processor 220, TX MIMO processor 230, MOD 232, antenna 234, and/or the like) may transmit DCI that schedules a first communication on a first bandwidth part and a second communication on a second bandwidth part, as described above. In some aspects, the DCI indicates one or more parameters for the first bandwidth part and the second bandwidth part in accordance with a bandwidth part configuration for a virtual bandwidth part.

As further shown in FIG. 9, in some aspects, process 900 may include performing the first communication and the second communication based at least in part on the one or more parameters (block 920). For example, the base station (e.g., using antenna 234, DEMOD 232, MIMO detector 236, receive processor 238, controller/processor 240, transmit processor 220, TX MIMO processor 230, MOD 232, and/or the like) may perform the first communication and the second communication based at least in part on the one or more parameters, as described above.

Process 900 may include additional aspects, such as any single aspect or any combination of aspects described below and/or in connection with one or more other processes described elsewhere herein.

In a first aspect, the DCI is DCI for the virtual bandwidth part.

In a second aspect, alone or in combination with the first aspect, the DCI indicates the bandwidth part configuration for the virtual bandwidth part, and the virtual bandwidth part is associated with a plurality of bandwidth part configurations that indicate respective parameters for the first bandwidth part and the second bandwidth part.

In a third aspect, alone or in combination with one or more of the first and second aspects, a parameter, of the one or more parameters, comprises at least one of a numerology or a bandwidth, and the parameter has a same value for the first bandwidth part and a corresponding region of the virtual bandwidth part, or for the second bandwidth part and a corresponding region of the virtual bandwidth part.

In a fourth aspect, alone or in combination with one or more of the first through third aspects, a parameter, of the one or more parameters, associated with a corresponding bandwidth part of the first bandwidth part and the second bandwidth part, is different if determined based at least in part on the bandwidth part configuration for the virtual bandwidth part than if determined based at least in part on a bandwidth part configuration for the corresponding bandwidth part.

In a fifth aspect, alone or in combination with one or more of the first through fourth aspects, the DCI has a smaller size than DCIs, used to indicate the one or more parameters, that are for the first bandwidth part and the second bandwidth part.

In a sixth aspect, alone or in combination with one or more of the first through fifth aspects, process 900 includes transmitting DCI indicating the bandwidth part configuration for the virtual bandwidth part prior to transmitting the DCI that schedules the first communication and the second communication.

In a seventh aspect, alone or in combination with one or more of the first through sixth aspects, process 900 includes transmitting configuration information indicating a mapping between a bandwidth part index field of the virtual bandwidth part and bandwidth part indexes of the first bandwidth part and the second bandwidth part.

In an eighth aspect, alone or in combination with one or more of the first through seventh aspects, a single bandwidth part index jointly indicates respective bandwidth part indexes of the first bandwidth part and the second bandwidth part.

In a ninth aspect, alone or in combination with one or more of the first through eighth aspects, the first bandwidth part and the second bandwidth part are associated with respective bandwidth part indexes that separately indicate respective bandwidths of the first bandwidth part and the second bandwidth part.

In a tenth aspect, alone or in combination with one or more of the first through ninth aspects, the DCI is first DCI, and process 900 includes transmitting second DCI indicating to switch the first bandwidth part from a first bandwidth part index to a second bandwidth part index.

In an eleventh aspect, alone or in combination with one or more of the first through tenth aspects, the second DCI is for the virtual bandwidth part.

In a twelfth aspect, alone or in combination with one or more of the first through eleventh aspects, the second DCI is for the first bandwidth part.

In a thirteenth aspect, alone or in combination with one or more of the first through twelfth aspects, process 900 includes switching the first bandwidth part and the second bandwidth part based at least in part on the second DCI so that a same search space set identifier is associated with the first bandwidth part and the second bandwidth part after the switching is performed.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
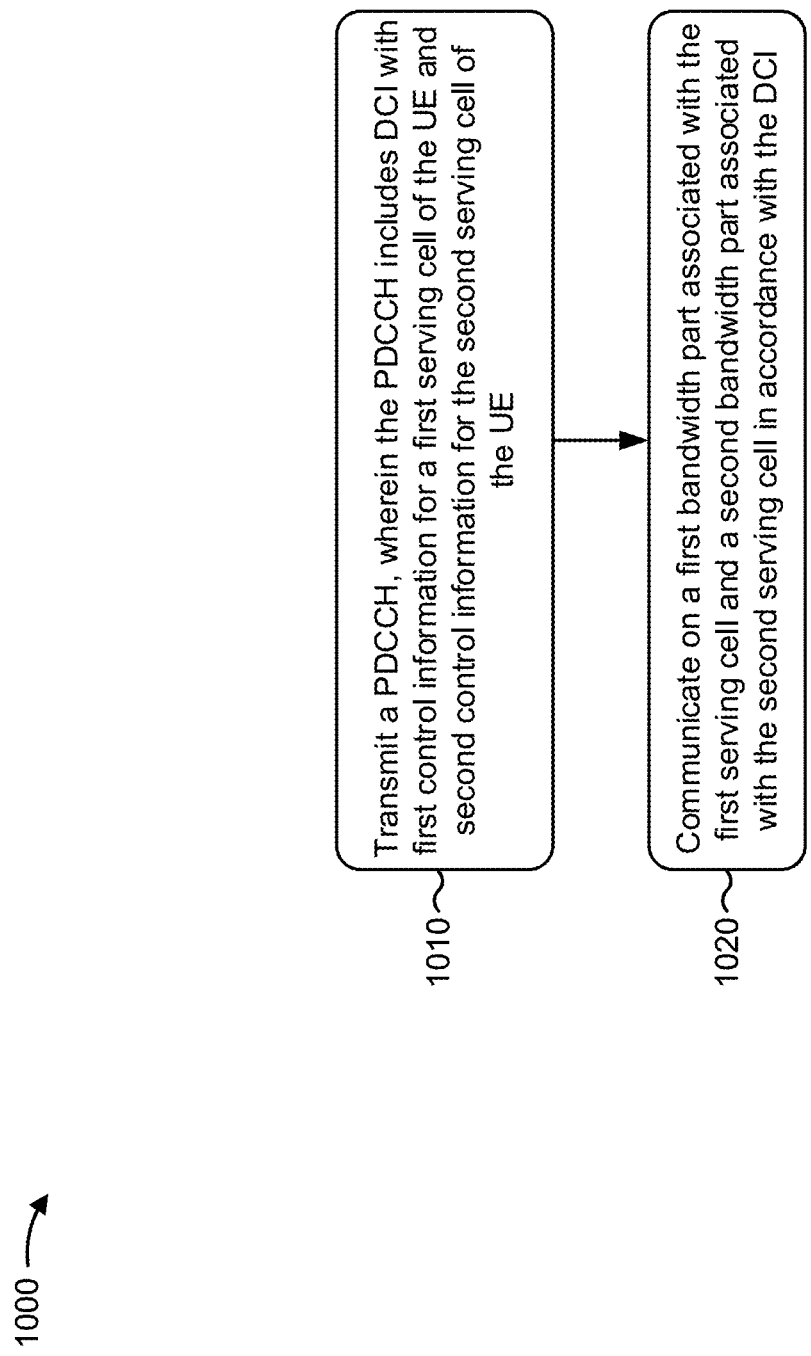
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110 and/or the like) performs operations associated with BWP operation for single DCI multi-cell scheduling.

As shown in FIG. 10, in some aspects, process 1000 may include transmitting, on a second serving cell of a UE, a PDCCH, wherein the PDCCH includes DCI with first control information for a first serving cell of the UE and second control information for the second serving cell of the UE (block 1010). For example, the base station (e.g., using controller/processor 240, transmit processor 220, TX MIMO processor 230, MOD 232, antenna 234, and/or the like) may transmit, on a second serving cell of a UE, a PDCCH, as described above. In some aspects, the PDCCH includes DCI with first control information for a first serving cell of the UE and second control information for the second serving cell of the UE. In some aspects, the first serving cell and the second serving cell are the same serving cell.

As further shown in FIG. 10, in some aspects, process 1000 may include communicating on a first bandwidth part associated with the first serving cell and a second bandwidth part associated with the second serving cell in accordance with the DCI (block 1020). For example, the base station (e.g., using antenna 234, DEMOD 232, MIMO detector 236, receive processor 238, controller/processor 240, transmit processor 220, TX MIMO processor 230, MOD 232, and/or the like) may communicate on a first bandwidth part associated with the first serving cell and a second bandwidth part associated with the second serving cell in accordance with the DCI, as described above.

Process 1000 may include additional aspects, such as any single aspect or any combination of aspects described below and/or in connection with one or more other processes described elsewhere herein.

In a first aspect, the DCI comprises a single DCI message.

In a second aspect, alone or in combination with the first aspect, communicating on the first bandwidth part and the second bandwidth part in accordance with the DCI further comprises communicating in accordance with respective bandwidth part configurations of the first bandwidth part and the second bandwidth part.

In a third aspect, alone or in combination with one or more of the first and second aspects, the respective bandwidth part configurations are indicated by the DCI.

In a fourth aspect, alone or in combination with one or more of the first through third aspects, the respective bandwidth part configurations are indicated by other DCI received prior to receiving the PDCCH.

In a fifth aspect, alone or in combination with one or more of the first through fourth aspects, the first control information and the second control information are indicated by a same one or more fields of the DCI, and a remainder of the DCI is padded in accordance with a maximum size of respective sizes associated with the first control information and the second control information.

In a sixth aspect, alone or in combination with one or more of the first through fifth aspects, process 1000 includes transmitting configuration information indicating a mapping between bandwidth part index fields of the first control information and the second control information, and bandwidth part indexes of the first bandwidth part and the second bandwidth part.

In a seventh aspect, alone or in combination with one or more of the first through sixth aspects, a single bandwidth part index jointly indicates respective bandwidth part indexes of the first bandwidth part and the second bandwidth part.

In an eighth aspect, alone or in combination with one or more of the first through seventh aspects, the first control information and the second control information are associated with respective bandwidth part indexes that separately indicate respective bandwidths of the first bandwidth part and the second bandwidth part.

In a ninth aspect, alone or in combination with one or more of the first through eighth aspects, the DCI is first DCI, and process 1000 includes transmitting second DCI indicating to switch the first bandwidth part from a first bandwidth part index to a second bandwidth part index.

In a tenth aspect, alone or in combination with one or more of the first through ninth aspects, the second DCI is for the first bandwidth part.

In an eleventh aspect, alone or in combination with one or more of the first through tenth aspects, process 1000 includes switching the first bandwidth part and the second bandwidth part based at least in part on the second DCI so that a same search space set identifier is associated with the first bandwidth part and the second bandwidth part after the switching is performed.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: receiving downlink control information (DCI) that schedules a first communication on a first bandwidth part and a second communication on a second bandwidth part; determining one or more parameters for the first bandwidth part and the second bandwidth part based at least in part on the DCI and in accordance with a bandwidth part configuration for a virtual bandwidth part; and performing the first communication and the second communication based at least in part on the one or more parameters.

Aspect 2: The method of Aspect 1, wherein the DCI is DCI for the virtual bandwidth part.

Aspect 3: The method of any of Aspects 1-2, wherein the DCI indicates the bandwidth part configuration for the virtual bandwidth part, and wherein the virtual bandwidth part is associated with a plurality of bandwidth part configurations that indicate respective parameters for the first bandwidth part and the second bandwidth part.

Aspect 4: The method of any of Aspects 1-3, wherein a parameter, of the one or more parameters, comprises at least one of a numerology or a bandwidth, and wherein the parameter has a same value for the first bandwidth part and a corresponding region of the virtual bandwidth part, or has a same value for the second bandwidth part and a corresponding region of the virtual bandwidth part.

Aspect 5: The method of any of Aspects 1-3, wherein a parameter, of the one or more parameters, associated with a corresponding bandwidth part of the first bandwidth part and the second bandwidth part, is different if determined based at least in part on the bandwidth part configuration for the virtual bandwidth part than if determined based at least in part on a bandwidth part configuration for the corresponding bandwidth part.

Aspect 6: The method of any of Aspects 1-5, wherein a size of the DCI is smaller than a cumulative size of DCIs, used to indicate the one or more parameters, that are for the first bandwidth part and the second bandwidth part.

Aspect 7: The method of any of Aspects 1-6, further comprising: receiving DCI indicating the bandwidth part configuration for the virtual bandwidth part prior to receiving the DCI that schedules the first communication and the second communication.

Aspect 8: The method of any of Aspects 1-7, further comprising: receiving configuration information indicating a mapping between a bandwidth part index field of the virtual bandwidth part and bandwidth part indexes of the first bandwidth part and the second bandwidth part.

Aspect 9: The method of Aspect 8, wherein a single bandwidth part index field jointly indicates respective bandwidth part indexes of the first bandwidth part and the second bandwidth part.

Aspect 10: The method of Aspect 8, wherein the first bandwidth part and the second bandwidth part are associated with respective bandwidth part index fields that separately indicate respective bandwidths of the first bandwidth part and the second bandwidth part.

Aspect 11: The method of any of Aspects 1-10, wherein the DCI is first DCI, and wherein the method further comprises: receiving second DCI indicating to switch the first bandwidth part from a first bandwidth part with a first index to a second bandwidth part with a second index.

Aspect 12: The method of Aspect 11, wherein the second DCI is for the virtual bandwidth part.

Aspect 13: The method of Aspect 12, further comprising: determining a configuration for the first bandwidth part based at least in part on the second bandwidth part and a corresponding bandwidth part configuration associated with the virtual bandwidth part.

Aspect 14: The method of Aspect 11, wherein the second DCI is for the first bandwidth part.

Aspect 15: The method of Aspect 14, further comprising: determining a configuration for the first bandwidth part based at least in part on the second bandwidth part and a corresponding bandwidth part configuration associated with the first bandwidth part.

Aspect 16: The method of Aspect 11, further comprising: switching the first bandwidth part and the second bandwidth part based at least in part on the second DCI so that a same search space set identifier is associated with the first bandwidth part and the second bandwidth part after the switching is performed.

Aspect 17: A method of wireless communication performed by a user equipment (UE), comprising: receiving, on a second serving cell of the UE, a physical downlink control channel (PDCCH), wherein the PDCCH includes downlink control information (DCI) with first control information for a first serving cell of the UE and second control information for the second serving cell of the UE; and communicating on a first bandwidth part associated with the first serving cell and a second bandwidth part associated with the second serving cell in accordance with the DCI.

Aspect 18: The method of Aspect 17, wherein the DCI comprises a single DCI message.

Aspect 19: The method of any of Aspects 17-18, wherein communicating on the first bandwidth part and the second bandwidth part in accordance with the DCI further comprises communicating in accordance with respective bandwidth part configurations of the first bandwidth part and the second bandwidth part.

Aspect 20: The method of Aspect 19, wherein the respective bandwidth part configurations are indicated by the DCI.

Aspect 21: The method of Aspect 19, wherein the respective bandwidth part configurations are indicated by other DCI received prior to the PDCCH.

Aspect 22: The method of Aspect 19, wherein the first control information and the second control information are indicated by a same one or more fields of the DCI, and wherein a remainder of the DCI is padded in accordance with a maximum size of respective sizes associated with the first control information and the second control information.

Aspect 23: The method of any of Aspects 17-22, further comprising: receiving configuration information indicating a mapping between bandwidth part index fields of the first control information and the second control information, and bandwidth part indexes of the first bandwidth part and the second bandwidth part.

Aspect 24: The method of Aspect 23, wherein a single bandwidth part index jointly indicates respective bandwidth part indexes of the first bandwidth part and the second bandwidth part.

Aspect 25: The method of Aspect 23, wherein the first control information and the second control information are associated with respective bandwidth part indexes that separately indicate respective bandwidths of the first bandwidth part and the second bandwidth part.

Aspect 26: The method of any of Aspects 17-25, wherein the DCI is first DCI, and wherein the method further comprises: receiving second DCI indicating to switch the first bandwidth part from a first bandwidth part index to a second bandwidth part index.

Aspect 27: The method of Aspect 26, wherein the second DCI is for the first bandwidth part.

Aspect 28: The method of Aspect 27, further comprising: determining a configuration for the first bandwidth part based at least in part on the second bandwidth part index and a corresponding bandwidth part configuration associated with the first bandwidth part.

Aspect 29: The method of Aspect 26, further comprising: switching the first bandwidth part and the second bandwidth part based at least in part on the second DCI so that a same search space set identifier is associated with the first bandwidth part and the second bandwidth part after the switching is performed.

Aspect 30: A method of wireless communication performed by a base station, comprising: transmitting downlink control information (DCI) that schedules a first communication on a first bandwidth part and a second communication on a second bandwidth part, wherein the DCI indicates one or more parameters for the first bandwidth part and the second bandwidth part in accordance with a bandwidth part configuration for a virtual bandwidth part; and performing the first communication and the second communication based at least in part on the one or more parameters.

Aspect 31: A method of wireless communication performed by a base station, comprising: transmitting, on a second serving cell of a user equipment (UE), a physical downlink control channel (PDCCH), wherein the PDCCH includes downlink control information (DCI) with first control information for a first serving cell of the UE and second control information for the second serving cell of the UE; and communicating on a first bandwidth part associated with the first serving cell and a second bandwidth part associated with the second serving cell in accordance with the DCI.

Aspect 30: An apparatus for wireless communication at a device, comprising a processor; memory coupled with the processor; and instructions stored in the memory and executable by the processor to cause the apparatus to perform the method of one or more Aspects of Aspects 1-29.

Aspect 31: A device for wireless communication, comprising a memory and one or more processors coupled to the memory, the memory and the one or more processors configured to perform the method of one or more Aspects of Aspects 1-29.

Aspect 32: An apparatus for wireless communication, comprising at least one means for performing the method of one or more Aspects of Aspects 1-29.

Aspect 33: A non-transitory computer-readable medium storing code for wireless communication, the code comprising instructions executable by a processor to perform the method of one or more Aspects of Aspects 1-29.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 1-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving, on a second serving cell of the UE, a physical downlink control channel (PDCCH), wherein the PDCCH includes downlink control information (DCI) with first control information for a first serving cell of the UE and second control information for the second serving cell of the UE, the first control information and the second control information being indicated by a same one or more fields of the DCI and a remainder of the DCI being padded in accordance with a maximum size of respective sizes associated with the first control information and the second control information; and
    communicating on a first bandwidth part associated with the first serving cell and a second bandwidth part associated with the second serving cell in accordance with the DCI and in accordance with respective bandwidth part configurations of the first bandwidth part and the second bandwidth part.

2. The method of claim 1, wherein the DCI comprises a single DCI message.

3. The method of claim 1, wherein the respective bandwidth part configurations are indicated by the DCI.

4. The method of claim 1, wherein the respective bandwidth part configurations are indicated by other DCI received prior to the PDCCH.

5. The method of claim 1, further comprising:
    receiving configuration information indicating a mapping between bandwidth part index fields of the first control information and the second control information, and bandwidth part indexes of the first bandwidth part and the second bandwidth part.

6. The method of claim 5, wherein a single bandwidth part index jointly indicates respective bandwidth part indexes of the first bandwidth part and the second bandwidth part.

7. The method of claim 5, wherein the first control information and the second control information are associated with respective bandwidth part indexes that separately indicate respective bandwidths of the first bandwidth part and the second bandwidth part.

8. The method of claim 1, wherein the DCI is first DCI, and wherein the method further comprises:
    receiving second DCI indicating to switch the first bandwidth part from a first bandwidth part index to a second bandwidth part index, wherein the second DCI is for the first bandwidth part.

9. The method of claim 8, further comprising:
    determining the respective bandwidth part configuration of the first bandwidth part based at least in part on the second bandwidth part index and a corresponding bandwidth part configuration associated with the first bandwidth part.

10. The method of claim 9, further comprising:
    switching the first bandwidth part and the second bandwidth part based at least in part on the second DCI so that a same search space set identifier is associated with the first bandwidth part and the second bandwidth part after the switching is performed.

11. The method of claim 1, wherein the first serving cell and the second serving cell are a same serving cell.

12. A method of wireless communication performed by a network entity, comprising:
transmitting, on a second serving cell of a user equipment (UE), a physical downlink control channel (PDCCH), wherein the PDCCH includes downlink control information (DCI) with first control information for a first serving cell of the UE and second control information for the second serving cell of the UE, the first control information and the second control information being indicated by a same one or more fields of the DCI and a remainder of the DCI being padded in accordance with a maximum size of respective sizes associated with the first control information and the second control information; and
communicating on a first bandwidth part associated with the first serving cell and a second bandwidth part associated with the second serving cell in accordance with the DCI and in accordance with respective bandwidth part configurations of the first bandwidth part and the second bandwidth part.

13. The method of claim 12, wherein the DCI comprises a single DCI message.

14. The method of claim 12, wherein the respective bandwidth part configurations are indicated by the DCI.

15. The method of claim 12, wherein the respective bandwidth part configurations are indicated by other DCI received prior to the PDCCH.

16. The method of claim 12, further comprising:
transmitting configuration information indicating a mapping between bandwidth part index fields of the first control information and the second control information, and bandwidth part indexes of the first bandwidth part and the second bandwidth part.

17. The method of claim 12, wherein the DCI is first DCI, and wherein the method further comprises:
transmitting second DCI indicating to switch the first bandwidth part from a first bandwidth part index to a second bandwidth part index, wherein the second DCI is for the first bandwidth part.

18. The method of claim 12, wherein the first serving cell and the second serving cell are a same serving cell.

19. A user equipment (UE) for wireless communication, comprising:
a memory; and
one or more processors, coupled to the memory, configured to:
receive, on a second serving cell of the UE, a physical downlink control channel (PDCCH), wherein the PDCCH includes downlink control information (DCI) with first control information for a first serving cell of the UE and second control information for the second serving cell of the UE, the first control information and the second control information being indicated by a same one or more fields of the DCI and a remainder of the DCI being padded in accordance with a maximum size of respective sizes associated with the first control information and the second control information; and
communicate on a first bandwidth part associated with the first serving cell and a second bandwidth part associated with the second serving cell in accordance with the DCI and in accordance with respective bandwidth part configurations of the first bandwidth part and the second bandwidth part.

20. The UE of claim 19, wherein the DCI comprises a single DCI message.

21. The UE of claim 19, wherein the respective bandwidth part configurations are indicated by the DCI.

22. The UE of claim 19, wherein the respective bandwidth part configurations are indicated by other DCI received prior to the PDCCH.

23. The UE of claim 19, wherein the one or more processors are further configured to:
receive configuration information indicating a mapping between bandwidth part index fields of the first control information and the second control information, and bandwidth part indexes of the first bandwidth part and the second bandwidth part.

24. The UE of claim 23, wherein a single bandwidth part index jointly indicates respective bandwidth part indexes of the first bandwidth part and the second bandwidth part.

25. The UE of claim 23, wherein the first control information and the second control information are associated with respective bandwidth part indexes that separately indicate respective bandwidths of the first bandwidth part and the second bandwidth part.

26. The UE of claim 19, wherein the DCI is first DCI, and wherein the one or more processors are further configured to:
receive second DCI indicating to switch the first bandwidth part from a first bandwidth part index to a second bandwidth part index, wherein the second DCI is for the first bandwidth part.

27. The UE of claim 26, wherein the one or more processors are further configured to:
determine the respective bandwidth part configuration of the first bandwidth part based at least in part on the second bandwidth part index and a corresponding bandwidth part configuration associated with the first bandwidth part.

28. The UE of claim 27, wherein the one or more processors are further configured to:
switch the first bandwidth part and the second bandwidth part based at least in part on the second DCI so that a same search space set identifier is associated with the first bandwidth part and the second bandwidth part after the switching is performed.

29. A network entity for wireless communication, comprising:
a memory; and
one or more processors, coupled to the memory, configured to:
transmit, on a second serving cell of a user equipment (UE), a physical downlink control channel (PDCCH), wherein the PDCCH includes downlink control information (DCI) with first control information for a first serving cell of the UE and second control information for the second serving cell of the UE, the first control information and the second control information being indicated by a same one or more fields of the DCI and a remainder of the DCI being padded in accordance with a maximum size of respective sizes associated with the first control information and the second control information; and
communicate on a first bandwidth part associated with the first serving cell and a second bandwidth part associated with the second serving cell in accordance with the DCI and in accordance with respective bandwidth part configurations of the first bandwidth part and the second bandwidth part.

30. The network entity of claim 29, wherein the DCI is first DCI, and wherein the one or more processors are further configured to:

transmit second DCI indicating to switch the first bandwidth part from a first bandwidth part index to a second bandwidth part index, wherein the second DCI is for the first bandwidth part.

\* \* \* \* \*